United States Patent
Potzler et al.

[11] Patent Number: 6,133,171
[45] Date of Patent: Oct. 17, 2000

[54] MECHANICALLY COMPACTED NON-WOVEN MATERIAL FOR USE IN THE PRODUCTION OF DIMENSIONALLY STABLE MOULDINGS

[75] Inventors: Bernd Potzler, Neuwied; Wolfgang Riediger, Kleinmaischeid, both of Germany

[73] Assignee: Lohmann GmbH & Co., KG, Neuwied, Germany

[21] Appl. No.: 08/969,739

[22] PCT Filed: May 10, 1996

[86] PCT No.: PCT/EP96/01997

§ 371 Date: Nov. 13, 1997

§ 102(e) Date: Nov. 13, 1997

[87] PCT Pub. No.: WO96/36755

PCT Pub. Date: Nov. 21, 1996

[30] Foreign Application Priority Data

May 18, 1995 [DE] Germany .................. 195 18 285

[51] Int. Cl.$^7$ ........................................ D04H 1/00
[52] U.S. Cl. ................ 442/362; 156/308.2; 264/119; 264/123; 264/172.15; 442/407; 442/411
[58] Field of Search ................... 442/362, 411, 442/407; 156/308.2; 264/119, 123, 172.15

[56] References Cited

U.S. PATENT DOCUMENTS

| | | | |
|---|---|---|---|
| 4,883,707 | 11/1989 | Newkirk | 428/219 |
| 5,198,057 | 3/1993 | Newkirk et al. | 156/83 |
| 5,569,525 | 10/1996 | Masuda et al. | 428/219 |

*Primary Examiner*—Blaine Copenheaver
*Attorney, Agent, or Firm*—Wenderoth, Lind & Ponack, LLP.

[57] ABSTRACT

To avoid breakage and weak points at the points of deflection in case of a large deflection angle and deep deformations a non-woven is formed of several fiber components, which forms a flexible, dimensionally stable molded article under pressure and temperature. An additional CoPES-fiber component facilitates lamination with other fibers without having to use additional auxiliaries.

9 Claims, No Drawings

MECHANICALLY COMPACTED NON-WOVEN MATERIAL FOR USE IN THE PRODUCTION OF DIMENSIONALLY STABLE MOULDINGS

BACKGROUND OF THE INVENTION

The present invention relates to mechanically strengthened nonwovens for the production of dimensionally stable, flexible molded articles.

The term "mechanically strengthened nonwovens" is understood to imply nonwovens which are mechanically strengthened by means of barbed needles in needle-punching, by water jets according to the spunlaced procedure, or by coulier needles in a stitchknitting method. These nonwovens may be manufactured, for example, by using polyester fibers stretched or partially stretched as polyethylene terephthalate fibers, as bicomponent fibers of polyethylene terephthalate polymers having differing softening points, or as homopolymeric melded fibers.

There are several techniques to manufacture nonwovens for moldings. For example, according to the so-called thermofusion procedure, these nonwovens of coarse polyester fibers (PES) having a portion of PES-bicomponent fibers (core/sheath) are deformed under pressure and temperature after solidification. The enveloping layer of the bicomponent fibers starts to fuse, thus causing the polyester fibers and the bicomponent fibers to fuse together at their crossings. This method is described in the journal "Techtextil Telegramm", 1991, number 21, page 3. The production of PES-spunbonded nonwovens using special binding fiber components represents another technique; under pressure and temperature these are processed into molded parts having a deformation depth of 35 cm, for example, used as primary substrate for formed tufted carpets (Konferenz Einzelbericht: Textilien im Automobil, Kongreß der VDl-Gesell. Textil und Bekleidung, 1993, Düsseldorf, Oct. 14th–15th 1993, pages 9–23).

Furthermore, mechanically strengthened nonwoven mats are known which, composed of three plies (covering nonwoven-filling nonwoven-covering nonwoven), are deformed under heat and used as supporting substrate for molded articles. This method is described in Konferenz Einzelbericht: 32nd Int. Chemiefasertagung 1993, Dornbirn, Austria, Sept. 22nd to 24th 1993, pages 1–25, Paper No. 68.

The known techniques permit the production of molded articles made of pure-grade fibrous materials which may be recycled.

Although extensive deformations may be achieved, these methods have the disadvantage that, in case of an extreme deflection angle and sophisticated forms, the materials break at the points of deflection or form weak points. To obtain a dimensionally stable deformation, these nonwovens must be strengthened to a high degree, and this results in loss of flexibility.

SUMMARY OF THE INVENTION

It is accordingly the object of the present invention to provide a nonwoven for the production of dimensionally stable, flexible molded articles that are highly strengthened on the one hand, and which neither break nor form weak points on the other hand, even in case of large deformation angles of >80° over a distance of >5 cm.

Side-by-side bicomponent fibers consist of two polymer components, in a round fiber cross-section each half consisting of one polymer.

DETAILED DESCRIPTION OF THE INVENTION

According to the present invention this object is achieved by the fact that the mechanically strengthened non-woven comprises 40 to 75 wt. % of homopolymeric, amorphous meldable fibers having a melting range of 165 to 175° C. and 10 to 40 wt. % of side-by-side bicomponent fibers.

To ensure good deformability, dimensional stability and the property of being recycled, further embodiments of the invention provide that the nonwoven preferably comprises 45 to 65 wt. % of melded fibers and 20 to 30 wt. % of side-by-side-bicomponent fibers.

Meldable fibers based on PES and bicomponent fibers based on PES (polyester)/CoPES(copolymeric polyester) are preferred. More preferably, the meldable fiber is based on pure PES. The preferred meldable fiber is amorphous polyethylene terephthalate having a crystalline portion of about 10–12 wt. %. The preferred CoPES contains a portion of polyethylene terephthalate.

The deformability is supported by a filling fiber of PES, for example, having a fineness of 3.3 dtex and a staple length of 38 mm. According to another embodiment, up to 20 wt. % of meldable fibers of PES are comprised to facilitate lamination with various materials. At 170° C. the fiber is completely molten and bonded in the molded article.

Further advantageous embodiments of the mechanically strengthened nonwoven are provided according to the following features.

The nonwoven may also contain up to 50 wt. % of filling fibers. Preferably, the filling fibers comprise polyesters such as polyethylene terephthalate.

Strengthening by needle-punching is particularly preferred.

The advantages which can be achieved by the present invention particularly lie in the fact that molded articles made of mechanically strengthened nonwovens can be produced that are lightweight, highly deformable, temperature-resistant even above 100° C., and capable of being recycled, and which neither break at the deflection points nor form weak points. In accordance with the respective demands, the nonwoven may easily be adapted to any desired form. The method of strengthening and the fiber composition may be adapted to the practical demands.

An embodiment example of the present invention will be illustrated in greater detail in the following.

Using a card, a fibrous web having an even weight per unit area is manufactured from a homogeneous mixture of 50 wt. % PES melded fiber 4.5/50 (dtex/mm staple length), 25 wt. % PES/CoPES-bicomponent fiber 3.3/50, 20 wt. % PES-filling fiber 3.3/38, and 5 wt. % PES-filling fiber 1.7/38. After passing the carding machine and transverse layering apparatus, a nonwoven is formed which has a weight per unit area of 200 to 250 g/m². This is slightly needle-punched by two needle passages of 50 to 80 stitches/cm² each, made-up, and rolled. Deformation is carried out in a pneumatic or hydraulic press. The molding plates are heated to about 185 to 190° C. In the closed position the distance between the plates is the same throughout the mold (0.2 to 1.5 mm). The mechanically strengthened non-woven is cut to size and placed into the mold. The plates are pressed together at about 2 N/cm² for about 20 sec. The inserted non-woven is slowly heated to 130° C. during the closing time (about 3 to 5 sec.). Owing to different shrinking properties of the two components, the bicomponent fiber reacts like a bimetallic spring and forms an extreme springtype crimp. This increases the elasticity in the non-woven to up to 200% in the longitudinal and transverse direction. This effect prevents the nonwoven from tearing at the points of deflection. With the mold completely closed, the melded fiber is activated, and the fiber crossings are bonded. After only one thermal loading, the amorphous fiber crystallizes and is subsequently present as a "normal" PES-fiber. For this reason, the temperature resistance is higher as compared to using PES/CoPES-melded fibers.

What is claimed is:

1. A mechanically strengthened, light-weight, highly deformable, pure-grade, recyclable molded article of a nonwoven material wherein the nonwoven material comprises:

40 to 75 wt. % of homopolymeric, amorphous meldable fibers having a melting temperature in a range of 165 to 175° C.;

10 to 40 wt. % of side-by-side bicomponent fibers containing PES (polyester) and CoPES (copolyester);

up to 20 wt. % of fusible fibers; and up to 50 wt. % of filling fibers.

2. The mechanically strengthened article according to claim 1, wherein the meldable fiber comprises pure PES.

3. The mechanically strengthened article according to claim 1 or 2, wherein the meldable fibers comprise polyethylene terephthalate, which is amorphous and has a crystalline portion of 10 to 12 wt. %.

4. The mechanically strengthened article according to claim 1, wherein the PES portion of the side-by-side bicomponent fibers comprises homopolymeric polyethylene terephthalate and the CoPES portion comprises copolymeric polyethylene terephthalate.

5. The mechanically strengthened article according to claim 1, wherein the filling fiber comprises polyethylene terephthalate.

6. The mechanically strengthened article according to claim 1, wherein the fusible fibers are completely molten at a temperature of 170° C.

7. The mechanically strengthened article according to claim 1, wherein the article will not break or form weak points even at a deformation angle >80° over a distance of >5 cm.

8. A process for the production of mechanically strengthened, light-weight, and highly deformable molded article of a nonwoven material according to claim 1, wherein a mechanically prefabricated and strengthened nonwoven comprising 40 to 75 wt. % homopolymeric, amorphous meldable fibers, 20 to 40 wt. % side-by-side bicomponent fibers containing PES and CoPES, up to 20 wt. % fusible fibers, and up to 50 wt. % filling fibers containing polyethylene terephthalate, is heated between molding plates of a heatable press under a molding pressure, causing the fibers fusing together at their crossing points.

9. The process of claim 8, further comprising strengthening of the nonwoven material by needle punching.

* * * * *